(12) United States Patent
Al-Mehdar et al.

(10) Patent No.: US 10,491,753 B2
(45) Date of Patent: Nov. 26, 2019

(54) OPTIMIZED POLICY CONTROL FUNCTION MAPPING FOR APPLICATION FUNCTION

(71) Applicant: T-Mobile USA, Inc., Bellevue, WA (US)

(72) Inventors: Mohammed Al-Mehdar, Bellevue, WA (US); Nassereddine Sabeur, Seattle, WA (US); Mayank Kaul, Bellevue, WA (US); Shujaur Mufti, Snoqualmie, WA (US); Kalyan Kalepu, Sammamish, WA (US); Chakravarthi Japa, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 29 days.

(21) Appl. No.: 15/937,205

(22) Filed: Mar. 27, 2018

(65) Prior Publication Data

US 2019/0306324 A1    Oct. 3, 2019

(51) Int. Cl.
| | |
|---|---|
| *H04L 29/12* | (2006.01) |
| *H04M 15/00* | (2006.01) |
| *H04L 29/06* | (2006.01) |
| *H04L 12/721* | (2013.01) |
| *H04L 12/741* | (2013.01) |
| *H04W 88/16* | (2009.01) |

(52) U.S. Cl.
CPC ............ *H04M 15/66* (2013.01); *H04L 45/72* (2013.01); *H04L 45/74* (2013.01); *H04L 61/2007* (2013.01); *H04L 65/1006* (2013.01); *H04L 65/1016* (2013.01); *H04L 65/1066* (2013.01); *H04W 88/16* (2013.01)

(58) Field of Classification Search
CPC .................. H04B 7/2121; H04B 7/2123; H04J 2203/0069; H04Q 2213/394; H04W 72/04; H04W 72/12; H04W 76/00; H04W 88/16; H04L 61/2007; H04L 65/1006; H04L 45/72; H04L 45/74; H04L 65/1066; H04L 65/1016
USPC ..................................................... 370/329
See application file for complete search history.

(56) References Cited

U.S. PATENT DOCUMENTS

| | | | |
|---|---|---|---|
| 8,489,096 B2* | 7/2013 | Rasanen ........... | H04W 36/0038 370/331 |
| 2004/0073686 A1* | 4/2004 | Hurta ................ | H04L 63/08 709/229 |
| 2012/0297076 A1* | 11/2012 | Wu .................... | H04L 12/14 709/227 |
| 2015/0103780 A1* | 4/2015 | Kaippallimalil ...... | H04W 60/00 370/329 |
| 2016/0156479 A1* | 6/2016 | Baek ................ | H04W 4/14 455/406 |
| 2018/0227267 A1* | 8/2018 | Joul ................. | H04M 15/56 |
| 2018/0270778 A1* | 9/2018 | Bharatia ........... | H04W 36/0011 |
| 2019/0021010 A1* | 1/2019 | Senarath ............ | H04L 41/0816 |

(Continued)

*Primary Examiner* — Robert J Lopata
(74) *Attorney, Agent, or Firm* — Lee & Hayes, P.C.

(57) ABSTRACT

An application function (AF) of an IP Multimedia Subsystem (IMS) can be in communication with multiple Policy Control Function (PCF) domains of a telecommunication network. The AF can review attributes of a particular communication session, and identify a particular one of the PCF domains that corresponds to the attributes. The AF can then send a request about the communication session to a PCF element of the identified PCF domain over an Rx interface.

12 Claims, 7 Drawing Sheets

(56) References Cited

U.S. PATENT DOCUMENTS

2019/0109823 A1* 4/2019 Qiao ................... H04L 12/1407
2019/0158408 A1* 5/2019 Li ........................... H04L 47/20
2019/0158985 A1* 5/2019 Dao ........................ H04W 4/06

* cited by examiner

OPTIMIZED POLICY CONTROL FUNCTION MAPPING FOR APPLICATION FUNCTION

BACKGROUND

In a telecommunication network, Policy and Charging Control (PCC) systems can be used to manage network resources and/or charge customer accounts. For example, PCC systems can be used to set up dedicated bearers for a particular communication session. PCC systems can also enforce policies applicable to a communication session by applying PCC rules to data packets of the communication session.

For example, when a communication session of a particular service is initiated through an application function of an IP Multimedia Subsystem (IMS), a Policy and Charging Rules Function (PCRF) or other PCC entity can inform a core network element to set up a dedicated bearer for the communication session and provide PCC rules for the communication session. The core network element can then apply the PCC rules to data packets of the communication session that are associated with the dedicated bearer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
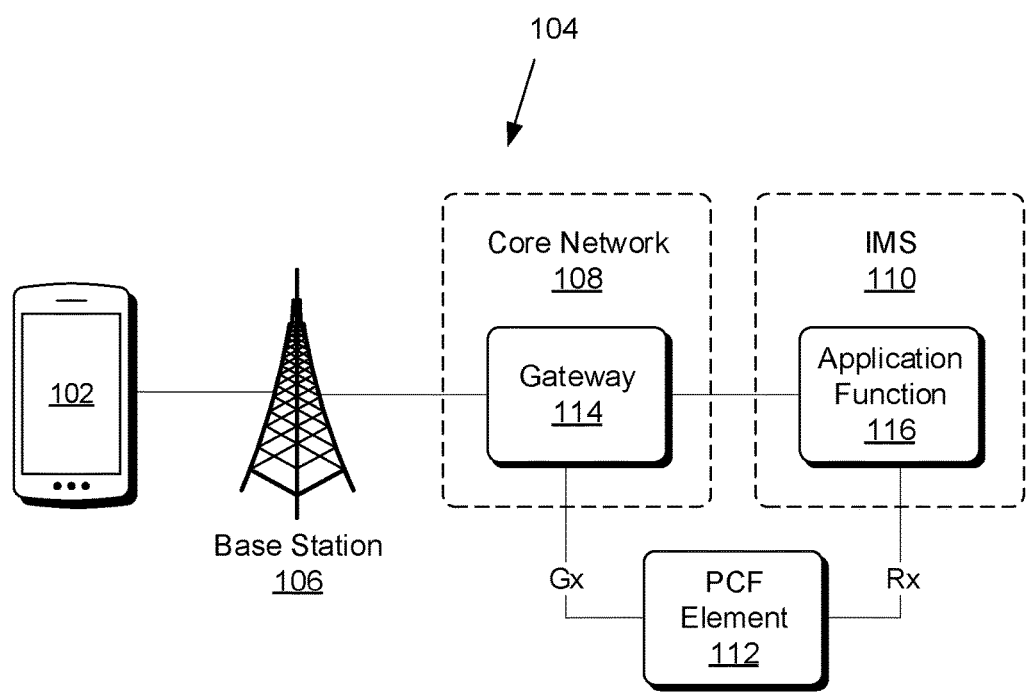
FIG. 1 depicts an example network environment in which user equipment (UE) can connect to a telecommunication network including a core network, an IP Multimedia Subsystem (IMS), and one or more Policy Control Function (PCF) elements.

In a telecommunication network, Policy and Charging Control (PCC) systems can be used to set up and manage network resources for particular communication sessions. For example, PCC systems can be used to set up dedicated bearers associated with communication sessions for voice calls, video calls, and/or other services. PCC systems can also apply PCC rules to data packets of such communication sessions, based on policies associated with the services used, Quality of Service (QoS) tiers, subscriber account attributes, and/or other factors.

For example, in a Long Term Evolution (LTE) network, a Policy and Charging Rules Function (PCRF) can be linked to a core network as well as an IP Multimedia Subsystem (IMS) that provides services for voice calls and/or other types of communications. The PCRF can be linked to a Packet Data Network (PDN) Gateway (P-GW) of the core network via a Gx interface based on the Diameter protocol. The PCRF can also be linked to an Application Function (AF) of the IMS via an Rx interface based on the Diameter protocol. For example, the AF can be a Proxy Call Session Control Function (P-CSCF), a Web Real-Time Communication (WebRTC) Gateway (WRG), or any other application function.

In this example, user equipment (UE) can initiate a communication session by sending a request in a user plane through the core network to the P-GW. The P-GW can inform a PCRF about the session through the Gx interface, and the PCRF can respond with a PCC rule applicable to the session. The P-GW can create a default bearer in the core network for the session, and apply the PCC rule to the default bearer. For example, a P-GW can have a Policy and Charging Enforcement Function (PCEF) that applies PCC rules to data packets of a session that pass through the P-GW.

After a default bearer has been set up for a communication session in the core network, the UE can send a request, such as a Session Initiation Protocol (SIP) request, through the P-GW to an AF in an IMS that assists with setup and/or management of network resources for a particular service. For example, the UE can request that an AF set up network resources for a Voice over LTE (VoLTE) call, Video over LTE (ViLTE) call, or any other service.

The AF can send an Authorize/Authenticate Request (AAR) message to the PCRF over the Rx interface to request setup of a dedicated bearer for the requested service of the communication session. For example, the AF can request that a dedicated bearer be set up for data packets of a VoLTE call. The PCRF can match the AF's request to information about the communication session previously received from the P-GW, and accordingly bind elements of the communication session that are associated with the P-GW and with the AF.

The PCRF can also send PCC rules applicable to the dedicated bearer to the P-GW over the Gx interface. The P-GW can accordingly set up the dedicated bearer within the core network, and apply the new PCC rules to the dedicated bearer.

Similarly, the AF can request that network resources be modified or released for a communication session. For example, an AF can request that a dedicated bearer for a particular service be modified or terminated by sending a message to a PCRF, which can inform the appropriate P-GW about the change and/or send the P-GW updated PCC rules applicable to the communication session.

Some early networks used a single subscriber pool and a single domain of PCRF that all shared the same session information, such that an AF could use any PCRF to manage network resources via P-GWs handling sessions for any subscriber. However, this approach was risky because failure of the single PCRF domain could lead to network failures for all subscribers. Accordingly, telecommunication networks evolved to use multiple PCRF domains, such as PCRF domains for different geographical regions, so that failure of one PCRF domain would not impact communication sessions handled by other PCRF domains.

However, when PCRFs were divided into different domains, networks began to maintain mapping information that associates particular IMS AFs and/or P-GWs with particular PCRF domains, to ensure that an AF managing a service for a communication session could find the PCRF domain handling that communication session. For example, many networks map particular AFs to particular PCRF domains associated with particular P-GWs, so that when a PCRF domain gets a request from an AF about a communication session, it can find existing information about that communication already received from a P-GW, for instance during session binding. However, this static mapping solution limits the flexibility of the AFs, as they cannot set up or manage services for communication sessions being handled by more than one PCRF domain.

Although this example illustrates limitations on AFs in LTE networks, AFs can be similarly limited in earlier and/or later generations of networks. For example, some fifth generation (5G) networks use a Policy Control Function (PCF) in place of a PCRF. Like PCRFs, PCFs can be grouped into domains, such that AFs can be limited by being mapped to specific PCF domains.

This disclosure describes systems and processes that allow an AF to set up and manage sessions through any PCC domain, thereby increasing the utility and flexibility of the AF.

Example Environment

FIG. 1 depicts an example network environment in which user equipment (UE) 102 can connect to a telecommunication network 104 to engage in communication sessions for voice calls, video calls, data transfers, or any other type of communication. A UE 102 can be any device that can wirelessly connect to the telecommunication network 104. For example, a UE 102 can be a smart phone, a cellular phone, a personal digital assistant (PDA), a personal computer (PC), a laptop, a desktop, a workstation, a media player, a tablet, a gaming device, a smart watch, or any other type of computing or communication device.

The telecommunication network 104 can have one or more base stations 106, a core network 108, an IP Multimedia Subsystem (IMS) 110, and one or more Policy Control Function (PCF) elements 112. Elements of the telecommunication network 104 can be based on one or more wireless access technologies and/or provide network access to UEs 102 through one or more wireless access technologies. For example, wireless access technologies can include fifth generation (5G) technology, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, and WiFi® technology.

A base station 106 can be a node or other access point that provides a connected UE 102 with access to the core network 108 through a wireless access technology. For example, a base station 106 can be a Node B (NB), eNode B (eNB), gNB, Wi-Fi access point, or any other type of base station or access point.

The core network 108 can include gateways 114 that can receive, process, and/or forward data packets from other network elements. For example, a gateway 114 can link the core network 108 to the IMS 110 and/or a PCF element 112. A gateway 114 can be linked to a PCF element 112 via a Gx interface based on the Diameter protocol.

Gateways 114 can also cause resources to be set up for a communication session within the core network 108. For example, a gateway 114 can set up default and dedicated bearers within the core network 108, or cause other elements of the core network 108 to set up such bearers. A default bearer can be set up to handle traffic related to setup and management of a communication session, while a dedicated bearer can be set up to handle traffic of a particular service or data type during the communication session.

The IMS 110 can include one or more Application Functions (AFs) 116. An AF 116 can provide one or more services for a communication session, as will be explained below. An AF 116 can be linked to a PCF element 112 via an Rx interface based on the Diameter protocol. In some examples, an AF 116 can be, or can run on, an IMS node such as a server or other computing device. Example architecture for an IMS node that can operate an AF 116 is illustrated in greater detail in FIG. 7 and is described in detail below with reference to that figure.

A PCF element 112 can maintain information about current communication sessions set up in the core network 108 for UEs 102, and can bind or link information about a particular communication session received from both a gateway 114 and an AF 116. As noted above, a PCF element 112 can be linked to a gateway 114 of the core network 108 via a Gx interface, and to an AF 116 of the IMS 110 via an Rx interface. A PCF element 112 can be, or can run on, a network node such as a server or other computing device.

As a first example, when a gateway 114 sets up a new communication session, such as causing a default bearer to be set up for a communication session, the gateway 114 can inform the PCF element 112 about the session via the Gx interface. In some examples, the gateway 114 can provide information about the communication session to the PCF element 112, such as a subscriber identifier, a source IP address of the UE 102, an identifier of the PCF element 112, other information about the core network 108, and/or any other information.

As a second example, an AF 116 can send a message to a PCF element 112 about a particular communication session via the Rx interface. For example, an AF 116 can send a message to a PCF element 112 requesting that a dedicated bearer be set up for a particular service, such as a VoLTE service, for the communication session. The AF 116 can also send information about the communication session, such as such as the subscriber identifier, the source IP address of the UE 102, an identifier of the AF 116, information about the service being provided or requested by the AF 116, and/or any other information.

The PCF element 112 can match information received from the AF 116 with information previously received from a gateway 114 to find existing information about the communication session. For example, when a gateway 114 provides a source IP address of a UE 102 when initially setting up a communication session for that UE 102, and the AF 116 provides the same source IP address, the PCF element 112 can find the communication session in its records. The PCF element 112 can accordingly bind elements of the communication session associated with the gateway 114 and the AF 116. This can also allow the PCF element 112 to identify the particular gateway 114 handling a particular communication session, so that the PCF element 112 can inform the gateway 114 about a request received from the AF 116, such as a request for a new dedicated bearer for a service or a modification or termination of an existing dedicated bearer.

A PCF element 112 can also maintain Policy and Charging Control (PCC) policies that define PCC rules corresponding to attributes of communication sessions. For example, PCC rules can be applicable to communication sessions based on a type of service or type of communication associated with a session, a subscriber account type or attribute, a Quality of Service (QoS) level associated with the session, or any other attribute. For example, PCC rules can define that data packets of a communication session should be given a certain priority level, be transmitted at at least a minimum bitrate, be transmitted on certain bearers, and/or be treated in any other specified way. In some examples, PCC rules can also define how a customer account is to be charged based on how data packets are transmitted or treated during a communication session.

When a PCF element 112 receives information about a new communication session from a gateway 114 over the Gx interface, it can find or generate default PCC rules applicable to a default bearer of the communication session based on attributes of the communication session. The PCF element 112 can return such default PCC rules to the gateway over the Gx interface, such that the gateway 114 can apply the default PCC rules to traffic associated with the default bearer of the communication session.

When a PCF element receives information about an existing communication session from an AF 116 over the Rx interface, it can find or generate dedicated PCC rules applicable to a dedicated bearer of the communication session based on attributes of the communication session. The PCF element 112 can send such dedicated PCC rules to the gateway 114 handling the communication session over the Gx interface, such that the gateway 114 can apply the dedicated PCC rules to traffic associated with the dedicated bearer of the communication session.

When a gateway 114 receives default or dedicated PCC rules for a communication session from a PCF element 112, it can apply the PCC rules to data packets of the communication session that pass through the gateway 114. For example, the gateway 114 can have a Policy and Charging Enforcement Function (PCEF) or other function that analyses data packets, determines which communication session the data packets are associated with, and apply any applicable PCC rules of the communication session to those data packets.

Figure 2:
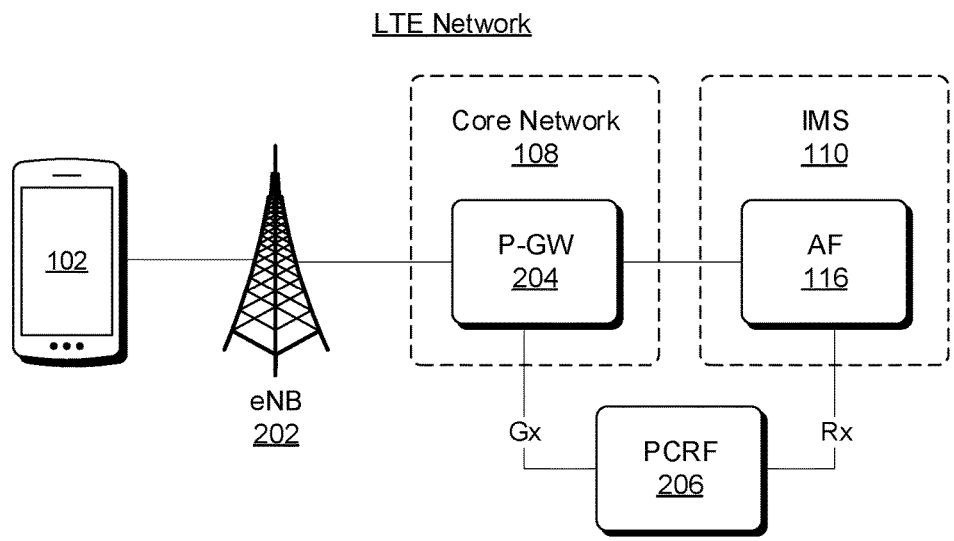
FIG. 2 depicts an example in which a telecommunication network is an LTE network.

FIG. 2 depicts an example in which the telecommunication network 104 is an LTE network. In an LTE network, a base station 106 can be an eNB 202, a gateway 114 in the core network 108 can be a Packet Data Network (PDN) Gateway (P-GW) 204, and a PCF element 112 can be a Policy and Charging Rules Function (PCRF) 206. Here, a PCRF 206 can exchange information about a communication session with an AF 116 over an Rx interface. A PCRF 206 can also provide PCC rules over a Gx interface to the P-GW 204 handling the communication session. In some examples, a PCEF in the P-GW 204 can then apply the PCC rules to data packets of the communication session that pass through the P-GW 204.

An LTE network can also include other nodes and/or elements. For example, although only a P-GW 204 is shown in FIG. 2, an eNB 202 can be linked to the P-GW 204 within the core network 108 via a Serving Gateway (S-GW). The core network 108 can also include a Mobility Management Entity (MME), a control node that can set up and manage default and dedicated bearers based on instructions from the P-GW 204, authenticate subscribers in conjunction with a Home Subscriber Server (HSS), choose an S-GW for a UE 102, and/or perform other network functions. Additionally, while the P-GW 204 shown in FIG. 2 is linked to the IMS 110, P-GWs 204 in the core network 108 can also or alternately be linked to other networks or entities, such as the Internet.

Figure 3:
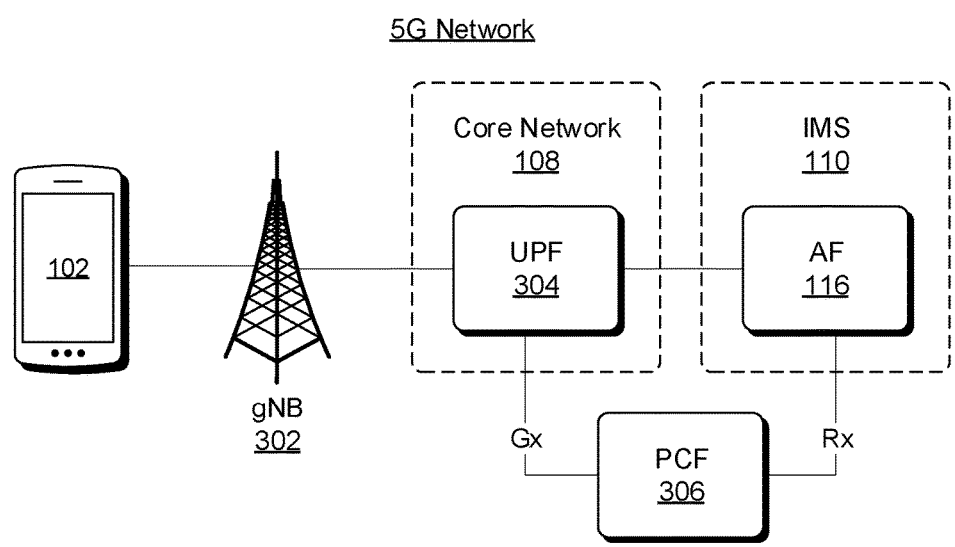
FIG. 3 depicts an example in which a telecommunication network is a 5G network.

FIG. 3 depicts an example in which the telecommunication network 104 is a 5G network. In a 5G network, a base station 106 can be a gNB 302, a gateway 114 in the core network 108 can include a User Plane Function (UPF) 304, and a PCF element 112 can be a Policy Control Function (PCF) 306. Here, a PCF 306 can exchange information about a communication session with an AF 116 over an Rx interface. A PCF 306 can also provide PCC rules over a Gx interface to a UPF 304 handling the communication session. The UPF 304 can then apply the PCC rules to data packets of the communication session that pass through the UPF 304.

Returning to FIG. 1, as noted above, an AF 116 can be an element of the IMS 110 that uses an Rx interface to exchange information with a PCF element 112 about a new or existing communication session. In some examples, the AF 116 can be compatible with one or more types of PCF elements 112, such as being compatible with both PCRFs 206 of an LTE network and PCFs 306 of a 5G network. As will be described further below, an AF 116 can choose which PCF element 112, or which domain of PCF elements 112, to contact about a particular communication session based on attributes of the communication session, such as the source IP address of the UE 102 or the type of core network 108 handling the communication session.

In some examples, an AF 116 can be a Proxy Call Session Control Function (P-CSCF) that can assist with setting up and managing resources for a communication session within the core network 108 related to a particular service. In this example, a UE 102 can initiate a voice call or other type of communication service by sending a Session Initiation Protocol (SIP) request to the P-CSCF through a default bearer previously set up in the core network 108. The P-CSCF can interpret the SIP request and send a request over an Rx interface to a PCF element 112 requesting that the core network 108 set up a dedicated bearer for the service. The PCF element 112 can accordingly identify which gateway 114 is handling the communication session based on information previously received from the gateway 114 over the Gx interface. The PCF element 112 can then instruct the gateway 114 to set up the dedicated bearer, and/or send PCC rules applicable to the dedicated bearer to the gateway 114 via the Gx interface. Similarly, the P-CSCF can request a modification or termination of an existing dedicated bearer by sending a message over the Rx interface to a PCF element 112, such that the PCF element 112 can relay the request to the correct gateway 114 and/or send the gateway 114 updated PCC rules.

In other examples, an AF 116 can be a Web Real-Time Communication (WebRTC) Gateway (WRG). A WRG can be an interface within the IMS 110 between web traffic and SIP messages, such that web traffic from a user originating from a web browser or other interface can be translated into SIP messages for setting up or managing a communication session via the telecommunication network 104. For example, a WRG in the IMS 110 can allow users to make or receive calls through a web browser running on a UE 102, or any other over-the-top application. A WRG can send a request about a communication session over an Rx interface to a PCF element 112, such that the PCF element 112 can relay the request and/or provide corresponding PCC rules to a gateway 114 handling the communication session.

In still other examples, an AF 116 can be an element of the IMS 110 that provides any other type of service. By way of non-limiting examples, an AF 116 can provide Wi-Fi calling services, services for handovers of existing communication sessions between different network elements and/or different types of telecommunication networks 104, or any other type of service that involves communication with a PCF element 112 over an Rx interface. For instance, an AF 116 that manages a handover of a service from an LTE network to a 5G network could contact a PCF element 112 of the 5G network to request that a dedicated bearer be set up for the service in the 5G network, and contact a PCF element 112 of the LTE network to request that a dedicated bearer for the service be terminated in the LTE network following the handover.

Figure 4:
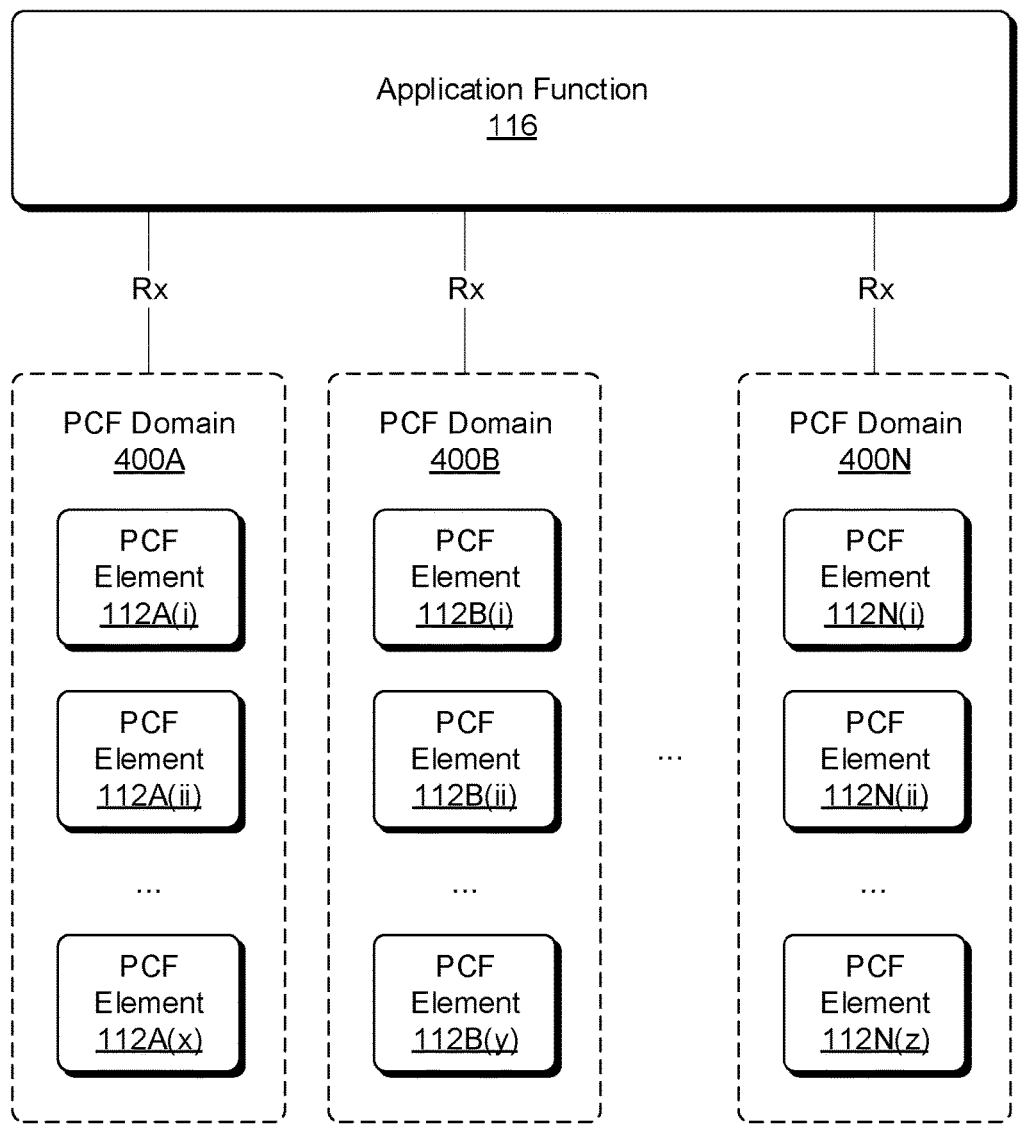
FIG. 4 depicts an application function (AF) of an IMS in communication with multiple PCF domains.

FIG. 4 depicts an AF 116 in communication with multiple PCF domains 400, such as PCF domains 400A, 400B, ..., 400N. Although FIG. 1 depicts a single PCF element 112, a telecommunication network 104 can have multiple PCF elements 112. PCF elements 112 can be divided into PCF domains 400, such that PCF elements 112 in a particular PCF domain 400 share information about all sessions being handled by that PCF domain 400. For example, one PCF element 112A(i) in a particular PCF domain 400A may receive information from a gateway 114 about a new communication session, and share that information with other PCF elements 112A(ii), 112A(iii), 112A(x) of the PCF domain 400A. Accordingly, an AF 116 can then contact any PCF element 112A in that particular PCF domain 400A about that communication session, and any PCF element 112A in that PCF domain 400A can identify which gateway 114 is handling the communication session. For example, when an AF 116 sends a request to a PCF domain 400A to set up a dedicated bearer in a communication session for a service, any PCF element 112A in the PCF domain 400A can identify the gateway 114 handling the communication session, instruct it to set up the dedicated bearer, and/or provide it with PCC rules for the dedicated bearer.

PCF elements 112 can be grouped into PCF domains 400 based on one or more common attributes of the communication sessions handled by those PCF elements 112. For instance, different PCF domains 400 can be associated with communication sessions of UEs 102 in different geographical areas, with communication sessions handled by different types of networks, and/or with any different attributes of any other type. Attributes of a communication session can be determined based on information about the UE 102, such as its source IP address, and/or information about a gateway 114 that is handling the communication session.

As one example, a PCF domain 400 can be configured to service communication sessions for UEs 102 that are primarily within a particular geographical region. In some examples, this can be done by associating the PCF domain 400 with a particular IP address pool that includes source IP addresses expected to be assigned to UEs 102 that are within a particular geographical area or that connect to base stations 106 or other network elements within that geographical area. Accordingly, one PCF domain 400 can be associated with one IP address pool for one geographical area, while another PCF domain 400 can be associated with another IP address pool for another geographical area. In other examples, a PCF domain 400 can include PCF elements 112 linked to gateways 114 located in a particular geographical area.

As a second example, a PCF domain 400 can be configured to service communication sessions handled by a particular type of network. In some examples, this can be done by associating the PCF domain 400 with a particular IP address pool that includes source IP addresses expected to be assigned to UEs 102 that connect to a particular type of network, such as an LTE network or 5G network. Accordingly, one PCF domain 400 can be associated with one IP address pool for one type of network, while another PCF domain 400 can be associated with another IP address pool for another type of network. In other examples, a PCF domain 400 can include PCF elements 112 linked to gateways 114 of a particular type, such as LTE P-GWs 204 or 5G UPFs 304.

Although PCF elements 112 can be grouped into multiple PCF domains 400 as discussed above, an AF 116 can be connected to some or all of the PCF domains 400 through Rx interfaces. The AF 116 can also have information that allows it to determine which of the PCF domains 400 will handle a particular communication session, based on attributes of a communication session.

In some examples, an AF 116 can have a mapping table that maps IP address pools to PCF domains 400 that have been associated with those IP address pools. As described above, an IP address pool can be associated with a particular geographic region, a type of network, or any other attribute. When the AF 116 receives information from a gateway 114 about a communication session, the AF 116 can use the mapping table to determine which PCF domain 400 to contact about the communication session, and/or which Rx interface to use to contact that PCF domain 400. For instance, the UE's source IP address can be included in a header or body of a message, such as a SIP message, forwarded to the AF 116 by the gateway 114. The AF 116 can accordingly determine which IP address pool the UE's source IP address falls into, and use the mapping table to find a corresponding PCF domain 400 that handles communication sessions for that IP address pool. Alternately, a gateway 114 that informs an AF 116 about a communication session can indicate which IP address pool it services, such that the AF 116 can use the mapping table to find a corresponding PCF domain 400.

In other examples, an AF 116 can associate information about gateways 114, such as their locations or network types, with PCF domains 400 that service those gateways 114. For example, when the AF 116 receives information about a communication session from a gateway 114 located in a particular geographical region, as indicated by a gateway identifier or location information, the AF 116 can contact a PCF domain 400 associated with that particular geographical region. As another example, when the AF 116 receives information about a communication session from a gateway 114 that it determines is an LTE P-GW 204 based on a gateway identifier or other information, the AF 116 can contact a PCF domain 400 that contains LTE PCRFs 206.

Figure 5:
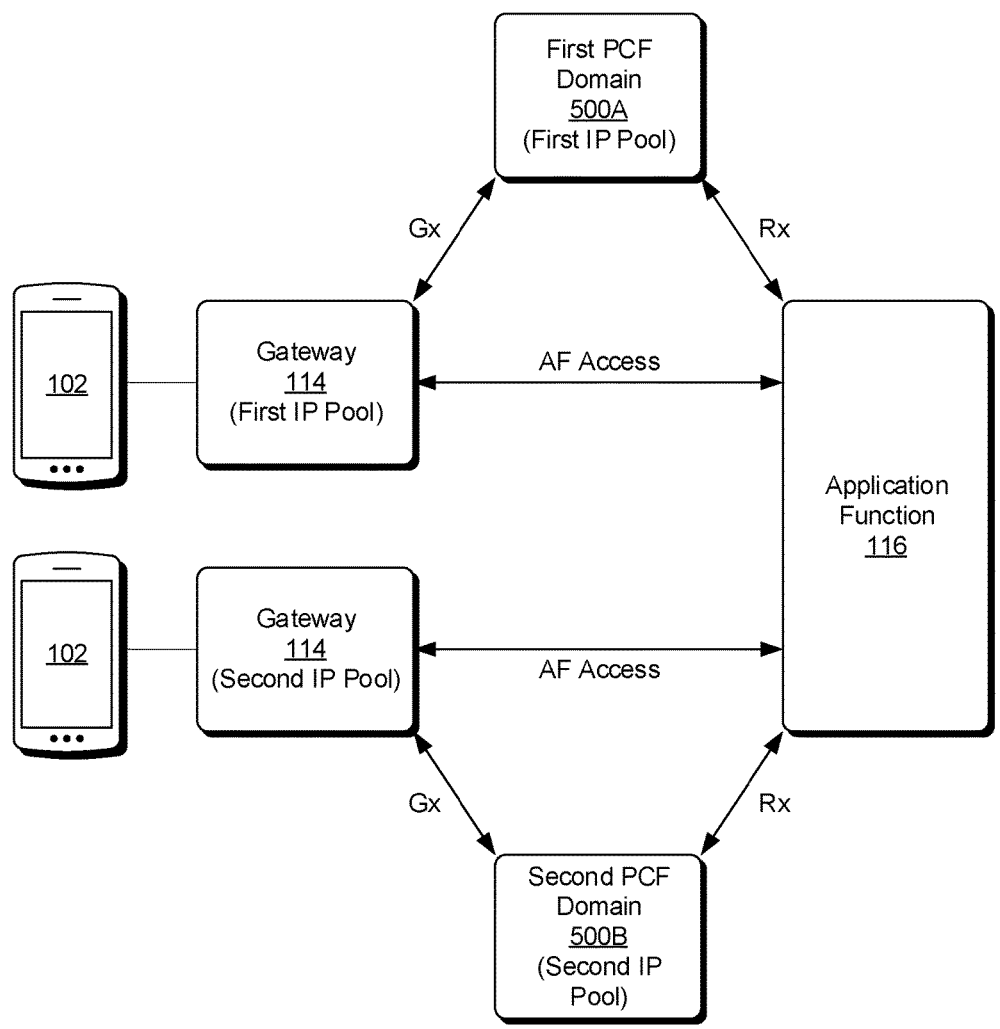
FIG. 5 depicts a first example in which an AF is in communication with a first PCF domain and a second PCF domain.

FIG. 5 depicts a first example in which an AF 116 is in communication with a first PCF domain 500A and a second PCF domain 500B. The first PCF domain 500A can be associated with a first IP address pool, while the second PCF domain 500B can be associated with a second IP address pool. As noted above, in some examples, a UE's source IP address can generally correspond with its geographical location. As such, in some examples the first PCF domain 500A can primarily handle communication sessions for UEs 102 in a first geographical region, and the second PCF domain 500B can primarily handle communication sessions for UEs 102 in a second geographical region. In some examples, the first PCF domain 500A and the second PCF domain 500B can contain the same types of PCF elements 112, such as LTE PCRFs 206 or 5G PCFs 306.

An AF 116 can determine which PCF domain 500 is handling a communication session based on which IP address pool the UE's source IP address falls into. A gateway 114 can send the AF 116 information about a communication session via an access interface. The information can include the UE's source IP address. For example, the information can be a SIP message, or any other message, that contains the UE's source IP address in a header or footer.

As such, if the UE's source IP address falls within the first IP address pool, the AF 116 can determine that the first PCF domain 500A would have information about the communication session. The AF 116 can thus contact a PCF element 112 in the first PCF domain 500A about the communication session using an Rx interface for the first PCF domain 500A. Similarly, if the UE's source IP address falls within the second IP address pool, the AF 116 can determine that the second PCF domain 500B would have information about the communication session. The AF 116 can thus contact a PCF element 112 in the second PCF domain 500B about the communication session using an Rx interface for the second PCF domain 500B. Accordingly, as shown in FIG. 5, an AF 116 can service both the first PCF domain 500A and the second PCF domain 500B, even if the two PCF domains 500 handle communication sessions for UEs 102 within different pools of source IP addresses that may be associated with different geographical regions.

Figure 6:
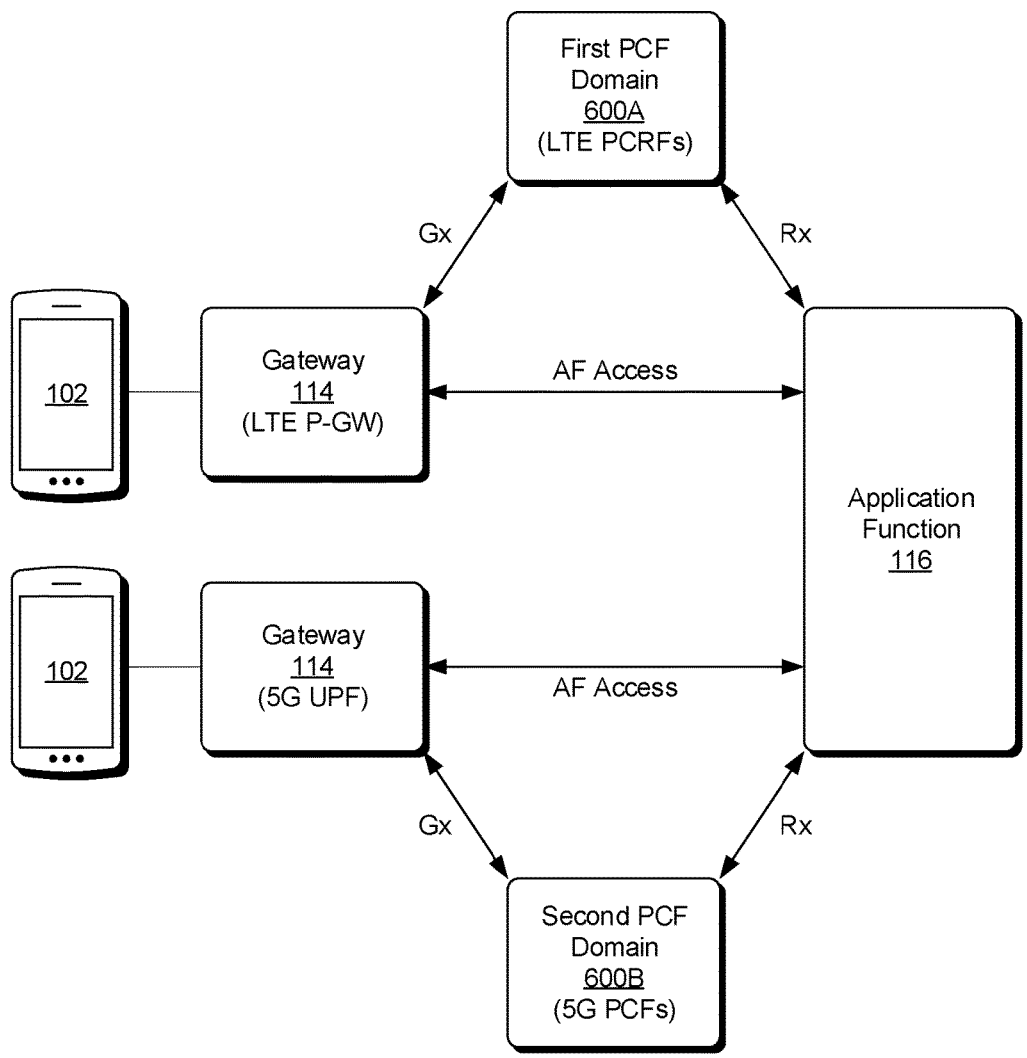
FIG. 6 depicts a second example in which an AF is in communication with a first PCF domain and a second PCF domain.

FIG. 6 depicts a second example in which an AF 116 is in communication with a first PCF domain 600A and a second PCF domain 600B. In this example, the first PCF domain 600A can be associated with a first type of network, while the second PCF domain 600B can be associated with a second type of network. For instance, the first PCF domain 600A can include PCRFs 206 of an LTE network, while the second PCF domain 600B can include PCFs 306 of a 5G network. An AF 116 can determine which PCF domain 600 is handling a communication session based on the type of network handling the communication session.

In some examples, an AF 116 can determine a type of network handling the communication session based on a UE's source IP address. For instance, the first PCF domain 600A and second PCF domain 600B can each be configured with different IP pools associated with different network types, such as a first IP address pool that includes source IP addresses expected to be assigned to UEs 102 connecting through an LTE network and a second IP address pool that includes source IP addresses expected to be assigned to UEs 102 connecting through a 5G network. Accordingly, the AF 116 can find a UE's source IP address within a SIP message or other information sent to the AF 116 from a gateway 114, and accordingly determine which PCF domain 600 is associated with an IP address pool encompassing that source IP address as described above with respect to FIG. 5.

In other examples, an AF 116 can determine a type of network handling the communication session based on information about the gateway 114. When a gateway 114 sends information about a communication session to the AF 116, the gateway 114 can also provide an identifier or other information that indicates a network type. For instance, a gateway 114 can indicate that it is an LTE P-GW 204 or a 5G UPF 304.

As such, if the gateway 114 indicates that it is part of the first type of network, the AF 116 can determine that the first PCF domain 600A would have information about the communication session. The AF 116 can thus contact a PCF element 112 in the first PCF domain 600A about the communication session using an Rx interface for the first PCF domain 600A. Similarly, if the gateway 114 indicates that it is part of the second type of network, the AF 116 can determine that the second PCF domain 600B would have information about the communication session. The AF 116 can thus contact a PCF element 112 in the second PCF domain 600B about the communication session using an Rx interface for the second PCF domain 600B. Accordingly, as shown in FIG. 6, an AF 116 can service both the first PCF domain 600A and the second PCF domain 600B, even if the two PCF domains 600 handle communication sessions for different network types.

Example Architecture

Figure 7:
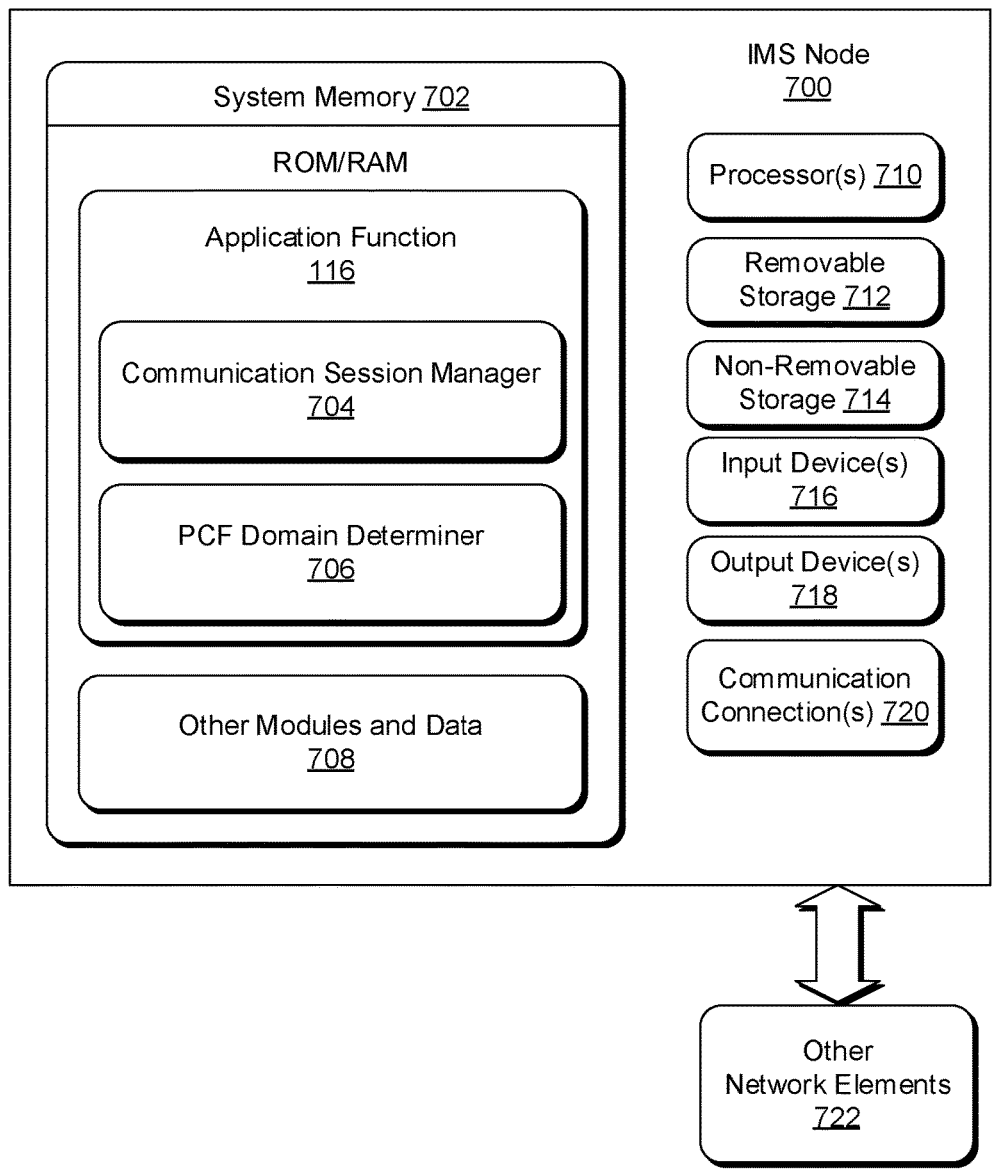
FIG. 7 illustrates an example architecture of an IMS node.

FIG. 7 illustrates an example architecture of an IMS node 700. As discussed above, an Application Function (AF) 116 can be, or be run by, an IMS node 700 in an IMS 110. An IMS node 700 can be a server or other network element or computing device. The IMS node 700 can have a system memory 702. The system memory 702 can store data for the AF 116, including a communication session manager 704 and a PCF domain determiner 706, and/or other modules and data 708. The IMS node 700 can also include processor(s) 710, removable storage 712, non-removable storage 714, input device(s) 716, output device(s) 718, and/or communication connections 720 for communicating with other network elements 722.

In various examples, system memory 702 can be volatile (such as RAM), non-volatile (such as ROM, flash memory, etc.), or some combination of the two. Example system memory 702 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

As discussed above, the AF 116 can provide one or more services, such as services for setting up a voice call, a video call, a data transfer, or any other type of communication. The communication session manager 704 of an AF 116 can assist in setting up and/or managing a communication session for such services. For example, the communication session manager 704 can determine that a dedicated bearer should be used to handle traffic of a service for a communication session, and accordingly send a request to a PCF element 112 asking that such a dedicated bearer be set up in the core network 108. The communication session manager 704 can also provide the PCF element 112 with information about the communication session and/or services provided by the AF 116, such that the PCF element 112 can identify the communication session, identify which gateway 114 is handling the communication session, and/or which PCC rules apply to the communication session.

The PCF domain determiner 706 can determine which PCF domain 400 is handling a particular communication session, such that the communication session manager 704 can contact the correct PCF domain 400 for the communication session. As described herein, the PCF domain determiner 706 can select between multiple PCF domains 400 based on attributes of the communication session, such as a geographic region of a UE 102 or a type of network handling the communication session. In some examples, the PCF domain determiner 706 can determine attributes of the communication session and identify a corresponding PCF domain 400 based on a UE's source IP address and/or information about a gateway 114 that informed the AF 116 about the communication session. In some examples, the PCF domain determiner 706 can select a PCF domain 400 for a communication session based on a mapping table or other information stored in the system memory 702 that relates attributes of a communication session to corresponding PCF domains 400. The PCF domain determiner 706 can also identify an Rx interface through which the AF 116 can contact a selected PCF domain 400.

The other modules and data 708 can be utilized by the IMS node 700 to perform or enable performing any action taken by the IMS node 700. The other modules and data 708 can include a platform and applications, and data utilized by the platform and applications.

In some embodiments, the processor(s) 710 is a central processing unit (CPU), a graphics processing unit (GPU), or both CPU and GPU, or other processing unit or component known in the art.

The IMS node 700 can also include additional data storage devices (removable and/or non-removable) such as, for example, magnetic disks, optical disks, or tape. Such additional storage is illustrated in FIG. 7 by removable storage 712 and non-removable storage 714. Computer storage media may include volatile and nonvolatile, removable and non-removable media implemented in any method or technology for storage of information, such as computer readable instructions, data structures, program modules, or other data. System memory 702, removable storage 712 and non-removable storage 714 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the IMS node 700. Any such computer-readable storage media can be part of the IMS node 700.

In various examples, any or all of system memory 702, removable storage 712, and non-removable storage 714, store programming instructions which, when executed, implement some or all of the above-described operations of the IMS node 700.

In some examples, the IMS node 700 can also have input device(s) 716, such as a keyboard, a mouse, a touch-sensitive display, voice input device, etc., and output device(s) 718 such as a display, speakers, a printer, etc. These devices are well known in the art and need not be discussed at length here.

The IMS node 700 can also contain communication connections 720 that allow the IMS node 700 to communicate with other network elements 722, such as gateways 114 and PCF elements 112. For example, a communication connection 720 can communicate with a PCF element 112 over an Rx interface based on the Diameter protocol. As another example, a communication connection 720 can receive information from a gateway 114 about a communication session, such as a SIP message requesting that a service be provided for a communication session.

Example Operations

Figure 8:
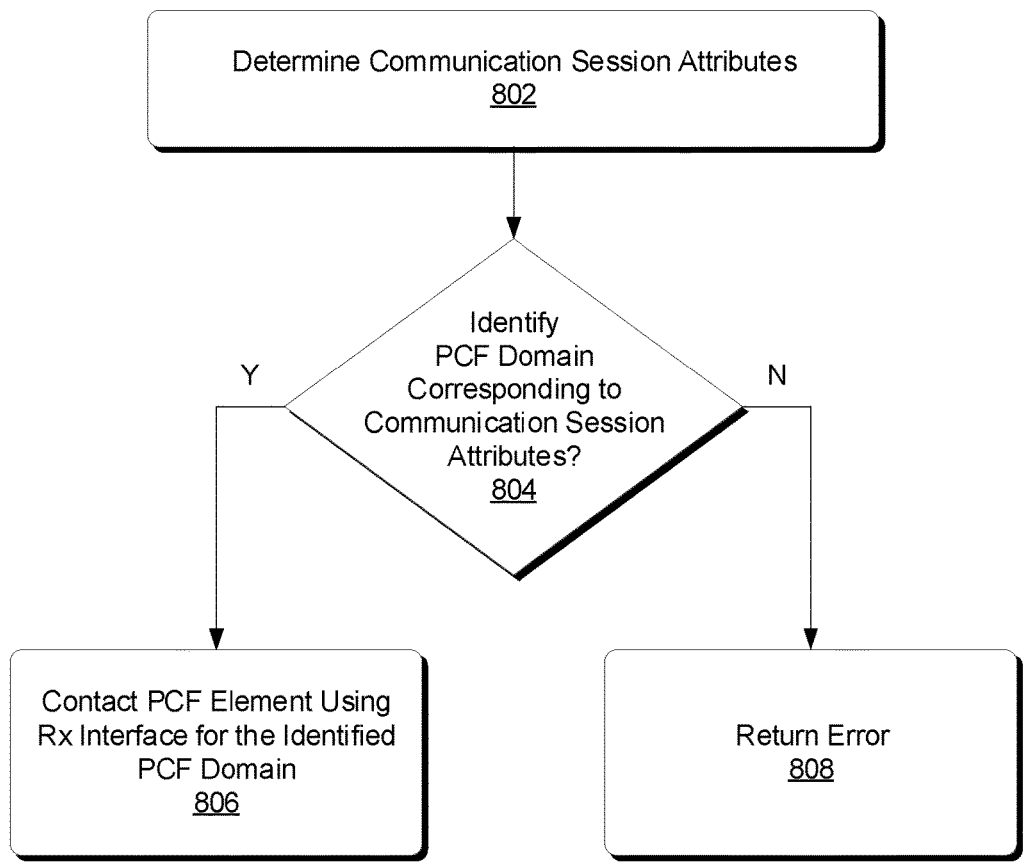
FIG. 8 depicts a flow chart of an exemplary process for an AF to determine which PCF domain to contact about a particular communication session.

FIG. 8 depicts a flow chart of an exemplary process for an AF 116 to determine which PCF domain 400 to contact about a particular communication session. As discussed above, an AF 116 can be in communication with multiple PCF domains 400 over Rx interfaces, including PCF domains 400 that handle communication sessions for UEs 102 in different geographic regions and/or communication sessions over different types of networks.

At block 802, the AF 116 can determine one or more attributes of a communication session, based on information received from a gateway 114 about the communication session. In some examples, the AF 116 can review a SIP message or other message received from a gateway 114 to find a source IP address of a UE 102. As described above, the UE's source IP address can indicate attributes of a communication session, as a source IP address can fall into an IP address pool associated with a particular geographical region and/or a particular network type. In other examples, the AF 116 can review information about the gateway 114, such as its geographical location and/or its network type, which can indicate attributes of a communication session.

At block 804, the AF 116 can identify a particular PCF domain 400 that corresponds with the communication session attributes determined during block 802. For example, when a first PCF domain 400 is associated with a first IP address pool corresponding to a particular geographical region and/or a particular network type, and the communication session attributes indicate that the UE 102 has a source IP address that falls within that first IP address pool, the AF 116 can determine that the communication session attributes correspond with the first PCF domain 400. As another example, when the AF 116 determines that the gateway 114 that informed it about the communication session is an LTE P-GW 204 and the first PCF domain 400 includes LTE PCRFs 206, the AF 116 can determine that the communication session attributes correspond with the first PCF domain 400.

In some examples, the AF 116 can use a mapping table during step 804 to identify a PCF domain 400 that corresponds with the communication session attributes. For example, as described above, the AF 116 can maintain a mapping table that maps IP address pools to PCF domains 400 that have been associated with those IP address pools, such that the AF 116 can use the mapping table to look up a PCF domain 400 associated with a particular source IP address. In other examples, the AF 116 can loop through information about one or more known PCF domains 400 until it finds a PCF domain 400 that corresponds with the communication session attributes.

If the AF 116 is able to identify a PCF domain 400 corresponding to the communication session attributes during block 804, the AF 116 can move to block 806 and use an Rx interface associated with the identified PCF domain 400 to send a message about the communication session to a PCF element 112 in the identified PCF domain 400.

However, if the AF 116 determines at block 804 that the communication session attributes do not correspond with any of the PCF domains 400 to which the AF 116 is connected, the AF 116 can move to block 808 and return an error to the UE 102 and/or gateway 114 that informed the AF 116 about the communication session.

CONCLUSION

As described above, an AF 116 can be in communication with multiple PCF domains 400 that may service different geographical regions, different network types, or different attributes of any other type. The AF 116 can accordingly set up or manage services for communication sessions that are handled by any type of gateway 114 and/or PCF domain 400. By reviewing attributes about a particular communication session, the AF 116 can determine which PCF domain 400 corresponds to those attributes, such that the AF 116 can send messages about the communication session to the appropriate corresponding PCF domain 400.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   determining, by an application function of an IP Multimedia Subsystem (IMS), one or more attributes of a communication session in a telecommunication network;
   identifying, by the application function, a Policy Control Function (PCF) domain of a plurality of PCF domains that corresponds to the one or more attributes, wherein the plurality of PCF domains comprises a first PCF domain associated with a first IP address pool and a second PCF domain associated with a second IP address pool; and
   sending, by the application function, a request about the communication session to a PCF element of the PCF domain over an Rx interface,
   wherein the first IP address pool contains source IP addresses assignable to user equipment that connect through a first network type and the second IP address pool contains source IP addresses assignable to user equipment that connect through a second network type.

2. The method of claim 1, wherein the one or more attributes is a source IP address of user equipment that initiated the communication session, and the application function identifies the PCF domain as the first PCF domain when the source IP address is within the first IP address pool and identifies the PCF domain as the second PCF domain when the source IP address is within the second IP address pool.

3. The method of claim 1, wherein the first PCF domain contains Policy and Charging Rules Functions (PCRFs) of an LTE network and the second PCF domain contains PCFs of a 5G network.

4. The method of claim 1, wherein the request is a request to set up a dedicated bearer in a core network of the telecommunication network.

5. The method of claim 4, wherein the request causes the PCF element to send a Policy and Charging Control (PCC) rule for the dedicated bearer to a gateway that is handling the communication session in the core network, the PCC rule corresponding to the communication session.

6. The method of claim 1, wherein the application function determines the one or more attributes based on information received from a gateway of a core network of the telecommunications network.

7. The method of claim 6, wherein the information is contained in a Session Initiation Protocol (SIP) request from user equipment associated with the communication session that is forwarded to the application function by the gateway.

8. The method of claim 1, wherein the application function is a Proxy Call Session Control Function (P-CSCF).

9. The method of claim 1, wherein the application function is a Web Real-Time Communication (WebRTC) Gateway (WRG).

10. A node of an IP Multimedia Subsystem (IMS) network, comprising:
    one or more processors;
    a first communication connection configured to exchange information with a gateway of a core network;
    a second communication connection configured to exchange information with a plurality of Policy Control Function (PCF) domains, wherein the plurality of PCF domains comprises a first PCF domain associated with a first IP address pool and a second PCF domain associated with a second IP address pool;
    memory storing computer-executable instructions that, when executed by the one or more processors, cause the one or more processors to perform operations comprising:
       determining one or more attributes of a communication session based on information received from the gateway;
       identifying a PCF domain of the plurality of PCF domains that corresponds to the one or more attributes; and
       sending a request about the communication session to a PCF element of the PCF domain over an Rx interface,
    wherein the first IP address pool contains source IP addresses assignable to user equipment that connect through a first network type and the second IP address pool contains source IP addresses assignable to user equipment that connect through a second network type.

11. The node of claim 10, wherein the one or more attributes is a source IP address of user equipment that initiated the communication session, and the application function identifies the PCF domain as the first PCF domain when the source IP address is within the first IP address pool and identifies the PCF domain as the second PCF domain when the source IP address is within the second IP address pool.

12. One or more non-transitory computer-readable media storing computer-executable instructions that, when executed by one or more processors, cause the one or more processors to perform operations comprising:
    determining a source IP address of user equipment that initiated a communication session based on information about the communication session received from a gateway of a core network;
    identifying a Policy Control Function (PCF) domain of a plurality of PCF domains that corresponds to the source IP address; and
    sending a request about the communication session to a PCF element of the PCF domain over an Rx interface,
    wherein the plurality of PCF domains comprises a first PCF domain associated with a first IP address pool and a second PCF domain associated with a second IP address pool, such that the PCF domain is identified as the first PCF domain when the source IP address is within the first IP address pool and the PCF domain is identified as the second PCF domain when the source IP address is within the second IP address pool, and
    wherein the first IP address pool contains source IP addresses assignable to user equipment that connect through a first network type and the second IP address pool contains source IP addresses assignable to user equipment that connect through a second network type.

* * * * *